Oct. 4, 1966  H. O. JONES  3,277,256
HERMETICALLY SEALED STRIP SWITCH
Filed March 26, 1965
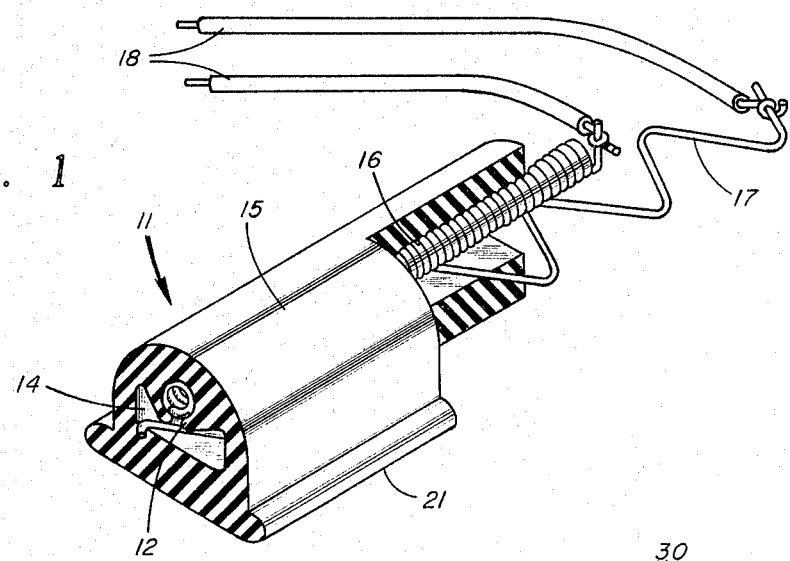
FIG. 1
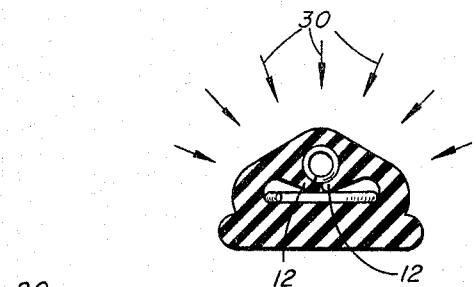
FIG. 2C
FIG. 2B
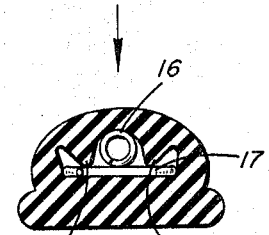
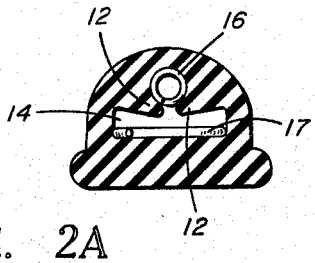
FIG. 2A
INVENTOR
Herbert O. Jones
BY
ATTORNEY United States Patent Office 3,277,256
Patented Oct. 4, 1966

3,277,256
HERMETICALLY SEALED STRIP SWITCH
Herbert O. Jones, Silver Spring, Md., assignor to the United States of America as represented by the Secretary of the Navy
Filed Mar. 26, 1965, Ser. No. 443,112
4 Claims. (Cl. 200—61.43)

The invention described herein may be manufactured and used by or for the Government of the United States of America for governmental purposes without the payment of any royalties thereon or therefor.

This invention relates to a switch for electrically sensing impact or contact between two objects and more particularly to a switch in strip form which can be wrapped around a sensing object and which will discriminate between actual contacts and the effects of short duration accelerations or hydrostatic pressure.

Heretofore, inertia switches and multiple switches have been employed for electrically sensing contacts between two objects, such as a water mine and a floating object. Inertia switches register the contacts but have not been able to satisfactorily discriminate against acceleration effects. Multiple switches can discriminate between contacts and acceleration effects, but have not been able to provide reasonable coverage of the sensing object without incorporating a network of cumbersome switch actuating arms which are subject to fouling, jamming or damage from rough handling. The need has long existed for a sensing switch which could efficiently cover the surface of a sensing object and could readily distinguish between actual impacts and hydrostatic pressure or acceleration effects such that the switch is not actuated accidentally.

The present invention is a novel sensing switch which is not subject to environmental actuation and efficiently covers a sensing object by the provision of a flexible lightweight hermetically sealed switch having a resilient housing of a rubbery or plastic material.

An object, therefore, is the provision of a sensing switch which discriminates between actual object contacts and apparent contacts due to hydrostatic pressure, vibration, or shock and which can be configured for efficient coverage of a sensing object.

Another object is to provide a lightweight switch in a continuous flexible strip form which senses actual contacts between objects but which is highly resistant to shock or hydrostatic pressures.

With these and other objects in view, as will hereinafter more fully appear, and which will be more particularly pointed out in the appended claims, reference is now made to the following description taken in connection with the accompanying drawing in which:

FIG. 1 shows a perspective view, partly in section, of the invention;

FIG. 2a is a cross-sectional view of FIG. 1;

FIG. 2b is a cross-sectional view of FIG. 1 when a contact force is applied to the invention; and FIG. 2c is a cross-sectional view of FIG. 1 with hydrostatic pressure applied.

The invention is illustrated by the embodiment shown in FIGS. 1 and 2 where a housing 11 encloses two sensing electrodes 16 and 17. FIG. 1 is a cut-out portion of a continuous strip switch which may be in a length depending on the configuration of a surface to be covered. The housing 11 is made of a flexible resilient material which, for example, could be polyvinylchloride, a silicon rubber compound, neoprene, or natural rubber, and is designed to completely make a watertight seal about two sensing electrodes 16 and 17. Electrode 16 may be of a wound coil type shown in the figures and the electrode 17 may be a thin flat strip, a straight wire electrode, or one having a sawtooth pattern as shown in FIG. 1.

The housing 11 is designed to normally hold contact elements 16 and 17 apart but is flexible enough such that when a force is applied to the arcuate surface 15 of the strip, the housing distorts and the electrodes touch in the vicinity of the contact, making an electrical circuit through leads 18 which may be used to carry a sensing signal to indicate contact or impact between two objects. Surface 15 is normally exposed to the environment while base portion 21 of the housing fits against the sensing object. The electrodes 16 and 17 may be of any satisfactory conducting material which is lightweight.

The operation of the switch under different environmental conditions is clearly shown in FIG. 2 where figures 2a, 2b and 2c are cross-sectional views of the housing 11. FIG. 2a illustrates the normal shape of the housing. It can be seen that in this form, the coil spring electrode 16 is nearly encircled by finger-like projections 12 for the inner surface of the housing and is thus isolated and held away from electrode 17. FIG. 2b shows the manner in which the housing distorts when a localized force 20 is applied to the top of the curved surface of the housing 11. A force 20 applied in this manner drives the coil spring electrode 16 toward electrode 17 and at the same time, a distortion of the housing 11 causes the fingers 12 to swing out from between the two electrodes permitting the electrical closure of the switch. Upon removal of the actuating force the resilience of the housing, which has excellent natural damping properties, causes it to return to its original shape, and in so doing the finger portions 12 sweep in and under coil spring electrode 16 lifting it away from electrode 17 and breaking the electrical circuit. FIG. 2c shows the distortion of the housing when subjected to hydrostatic pressure 30. Under this influence, the sidewalls of the housing collapse inward forcing the fingers to completely encircle the coil spring electrode 16 and preventing switch closure. With hydrostatic pressure removed, the housing would again spring back to its natural position with the electrodes held apart.

It can now be seen that the invention provides a novel sensing device which is highly flexible in form which can be configured to provide a continuous sensitive surface for most efficient coverage of any given sensing object, which will distinguish between actual and apparent impacts, and which is highly resistant to environmental deterioration.

It should be understood, of course, that the foregoing disclosure relates to only a preferred embodiment of the invention and that numerous modifications or alterations may be made therein without departing from the spirit and the scope of the invention as set forth in the appended claims.

What is claimed is:
1. A continuous strip sealed switch assembly for sensing contact between two objects which may be shaped to conform to the contour of the surface of a sensing object comprising,
   a coiled spring electrode running the length of said strip,
   an elongated electrode element for making electrical contact with said coiled electrode and running the length of said strip, and
   a resilient flexible hermetically sealed housing having a curved outer surface facing away from said object, a flat outer surface for placing next to said sensing object and an irregularly shaped inner surface defining a cavity containing said electrodes,
   said inner surface having sidewalls with finger-like projections extending therefrom into said cavity normally substantially surrounding and supporting said coiled electrode in a spaced apart relationship with said elongated electrode element, said projections being of sufficient length to completely encircle said coiled spring electrode when pressure distorting forces are applied to said housing curved surface preventing electrical contact of said electrodes, which spread away from said coiled spring when a localized distorting force is applied to a point on said curved surface permitting said electrodes to make electrical contact.

2. The apparatus of claim 1 wherein said resilient housing is composed of a polyvinylchloride.

3. The apparatus as set forth in claim 1 wherein said finger-like projections break the electrical contact connection when the localized force is removed from said housing and said housing returns to its normal shape.

4. The apparatus of claim 1 wherein said electrode element is a wire bent in a saw-tooth pattern.

References Cited by the Examiner

UNITED STATES PATENTS

| | | | |
|---|---|---|---|
| 2,796,484 | 6/1957 | Wolf | 200—61.57 |
| 2,823,279 | 2/1958 | Schulenburg | 200—86 |
| 2,943,164 | 6/1960 | Kniffin | 200—61.57 |

BERNARD A. GILHEANY, *Primary Examiner.*

J. J. BAKER, *Assistant Examiner.*